United States Patent (10) Patent No.: US 10,099,207 B2
Stamenkovic et al. (45) Date of Patent: Oct. 16, 2018

(54) MULTIMETALLIC CORE/INTERLAYER/SHELL NANOPARTICLES

(71) Applicant: UChicago Argonne, LLC, Chicago, IL (US)

(72) Inventors: Vojislav Stamenkovic, Naperville, IL (US); Nenad Markovic, Hinsdale, IL (US); Yijin Kang, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 540 days.

(21) Appl. No.: 14/677,707

(22) Filed: Apr. 2, 2015

(65) Prior Publication Data

US 2016/0288102 A1 Oct. 6, 2016

(51) Int. Cl.
B01J 23/89 (2006.01)
B01J 37/08 (2006.01)
B01J 21/18 (2006.01)
B01J 35/00 (2006.01)
B01J 35/02 (2006.01)
B01J 37/16 (2006.01)
B82Y 40/00 (2011.01)
B01J 37/02 (2006.01)
H01M 4/86 (2006.01)
H01M 4/92 (2006.01)
B82Y 30/00 (2011.01)

(52) U.S. Cl.
CPC ............. B01J 23/892 (2013.01); B01J 21/18 (2013.01); B01J 35/008 (2013.01); B01J 35/0013 (2013.01); B01J 35/0033 (2013.01); B01J 37/08 (2013.01); B01J 37/16 (2013.01); B01J 37/0211 (2013.01); B82Y 30/00 (2013.01); B82Y 40/00 (2013.01); H01M 4/8657 (2013.01); H01M 4/92 (2013.01); Y10S 977/773 (2013.01); Y10S 977/892 (2013.01)

(58) Field of Classification Search
CPC ........ B01J 23/892; B01J 35/008; B01J 21/18; H01M 4/8657; H01M 4/92
See application file for complete search history.

(56) References Cited

U.S. PATENT DOCUMENTS 8,178,463 B2 5/2012 Stamenkovic et al.
8,685,878 B2 4/2014 Stamenkovic et al.
2010/0086832 A1* 4/2010 Lopez .................. B22F 1/0018 429/409
2016/0233516 A1* 8/2016 Nakamura .......... H01M 4/8657

* cited by examiner

Primary Examiner — Jun Li
(74) Attorney, Agent, or Firm — Foley & Lardner LLP

(57) ABSTRACT

A multimetallic core/interlayer/shell nanoparticle comprises an inner core formed from a first metal. An interlayer is disposed on the first layer. The interlayer includes a plurality of gold atoms. An outer shell is disposed over the interlayer. The outer shell includes platinum and the first metal. A surface of the NP is substantially free of gold. The first metal is selected from the group consisting of nickel, titanium, chromium, manganese, iron, cobalt, copper, vanadium, yttrium, ruthenium, palladium, scandium, tin, lead and zinc.

6 Claims, 15 Drawing Sheets

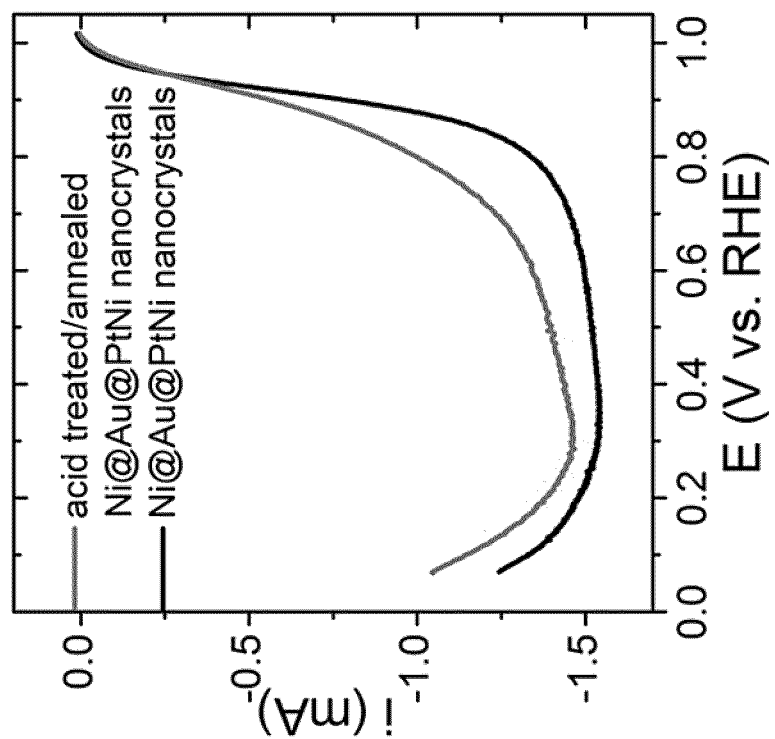
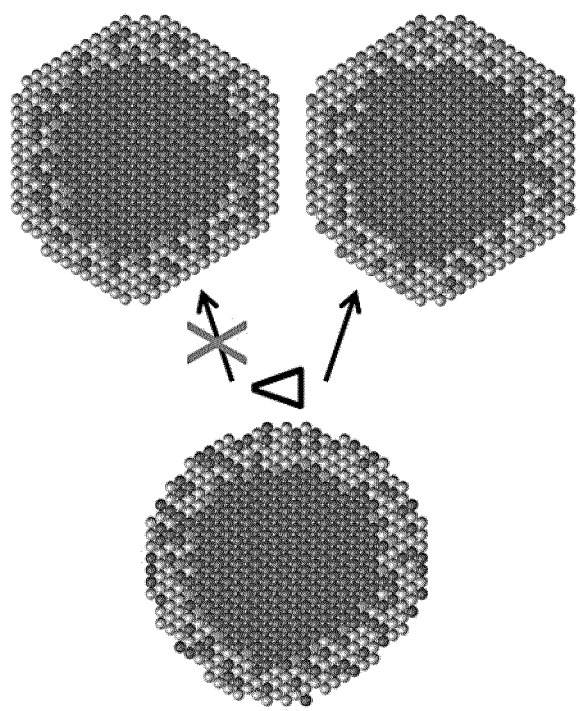
FIG. 11

MULTIMETALLIC CORE/INTERLAYER/SHELL NANOPARTICLES

This invention was made with government support in part under "Energy Efficiency and Renewable Energy (EERE)" Program awarded by the Department of Energy (DOE). The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to the field of nanoparticle (NP) based catalysts.

BACKGROUND

The field of catalysis has rapidly progressed with the advent of nanoscale or NP catalysts. Such NP based catalysts provide a high surface to volume ratio and a correspondingly high chemical efficiency. Most catalysts are based on precious metals. Use of precious metals increases the cost of the operation utilizing the catalyst and prevents commercialization of many technologies. For example, the global commercialization of polymer electrolyte membrane fuel cells (PEMFC) has been hindered to a large degree due to the sluggish kinetics of the cathodic oxygen reduction reaction (ORR) which forms the basis of the PEMFC, where significant quantities of precious metal based catalysts are required to produce desired power.

Platinum (Pt) is a popular catalyst and is used as the primary catalyst, for example in NP form, in many chemical reactions. Pt-transition metals (e.g., nickel (Ni), cobalt (Co), iron (Fe), copper (Cu), etc.) at Pt-transition metal alloys demonstrate superior activity to pure Pt as a result of changes in the electronic structure of surface Pt atoms induced by neighboring transition metal atoms, which optimizes the interaction strength with oxygenated intermediates during the ORR. While such binary Pt-transition metal alloys enhance activity, it does not address durability loss, for example loss of catalytic activity of the catalyst during operation over extended periods of time.

For example, the low pH and high oxygen content of the PEMFC cathode produces a highly corrosive environment with Pt-oxides readily forming at operational potentials, initiating at the high density of low-coordinated sites present on the surface of NP based catalysts. Surface oxides can readily move into the subsurface atomic layers through the place exchange mechanism where it can act to pull out the underlying transition metal and also promote dissolution of the surface Pt atoms. This leads to catalyst deactivation through the both loss of the favorable electronic effect induced by the dissolution of transition metal and loss of electrochemically active surface area (ECSA).

Other precious metals, such as gold (Au) can be used as a core material for enhancing the durability of such Pt NP based catalysts. However, this substantially increases the cost of the catalyst (e.g., cost per kilowatt in PEMFCs) which can render the use of the catalyst unfeasible. Furthermore, the activity per mass of Au of such NPs is still low because of the high Au content within the core which is inaccessible. However, when the composition of the core is deficient in precious metals (e.g., Au) and composed mostly of transition metals that have low redox potentials, thin layers of Pt (e.g. Pt monolayers) prove to be insufficient to protect the core from dissolution. Increasing the thickness of the pure Pt shell can improve the durability of the NPs, but Pt shell thicknesses beyond a few atomic layers lose the beneficial electronic effect from transition metal (e.g., Ni, Co, etc.) and leads to less active surface.

SUMMARY

Embodiments described herein relate generally to multimetallic NPs and in particular, to metal core/interlayer/shell (MCIS) NPs for use as catalysts.

In some embodiments, a NP comprises an inner core formed from a first metal. An interlayer is disposed on the first layer. The interlayer includes a plurality of gold atoms. An outer shell is disposed over the interlayer. The outer shell includes platinum and the first metal. A surface of the NP is substantially free of gold. In some embodiments, the first metal is selected from the group consisting of titanium, chromium, manganese, iron, cobalt, nickel, copper and zinc. In one embodiment, the first metal is nickel.

In some embodiments, a catalyst includes an electrically conducting substrate. A plurality of NPs are disposed within the substrate. The NPs include an inner core which is formed from a first metal. An interlayer is disposed on the first layer. The interlayer includes a plurality of gold atoms. An outer shell is disposed over the interlayer. The outer shell includes platinum and the first metal. Furthermore, a surface of the NPs is free of gold.

In some embodiments, a method of forming a NP which includes a Ni core, a Au interlayer, and a PtNi outer shell, comprises dissolving nickel(II)acetyl acetonate in a solution including oleylamine and oleic acid. The solution is heated to a first temperature. Tetraethylammonium borohydrate is added to the heated solution. The heating is maintained at the first temperature for a first time to form Ni NPs. The temperature of the solution is reduced to a second temperature. Benzyl ether, oleyl amine and gold(III)chloride are added to the solution. The solution is maintained at the second temperature for a second time to deposit Au on the Ni NPs and form Ni/Au NPs. Ni(II)acetate tetrahydrate, diphenyl ether and 1,2-tetradecanediol are added to the solution. The solution is then heated to a third temperature. Platinum(II)acetyl acetonate and o-dichlorobenzene are added to the solution. The heat is maintained for a third time to deposit Pt and Ni on the Ni/Au NPs and form Ni/Au/PtNi NPs.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 4 panel (a) is a TEM image of about 5.0 nm diameter PtNi NPs; panel (b) is a TEM image of about 5.1 nm diameter PtNi—Au NPs that have a surface coverage of Au of about 10%; panel (c) is a TEM image of about 5.1 nm diameter PtNi—Au NPs that have a surface coverage of Au of about 50%; panel (d) is a TEM image of Au/PtNi NPs of about 5.4 nm diameter; panel (e) is an EDX data showing the Pt peak (Pt—La line) and Au peak (Au—La line) of the NPs corresponding to the structures shown in panels (a-d); panel (f) is a plot of the corresponding ORR polarization curves showing that surface Au deactivates the ORR activity of PtNi NPs.

FIG. 7 panel (b) is the CV plot of panel (a) after subtracting CO stripping curves; and FIG. 7 panel (c) is a plot of ORR polarization curves of the plain and Au coated $Pt_3Ni$ substrates.

FIG. 11 is a schematic illustration and plot showing the negative effects of annealing on Ni/Au/PtNi NPs; instead of the Ni/Au/PtNi NP with a Pt-Skin structure, a Pt—Au—Ni nanostructure with surface Au which has a poor ORR electrocatalytic property is generated after annealing at 400 degrees Celsius; ORR curves are taken in $O_2$-saturated 0.1 M $HClO_4$, on rotating disc electrode at a rotating speed of 1,600 rpm, and at a scan rate of 20 mV/s.

Figure 1:
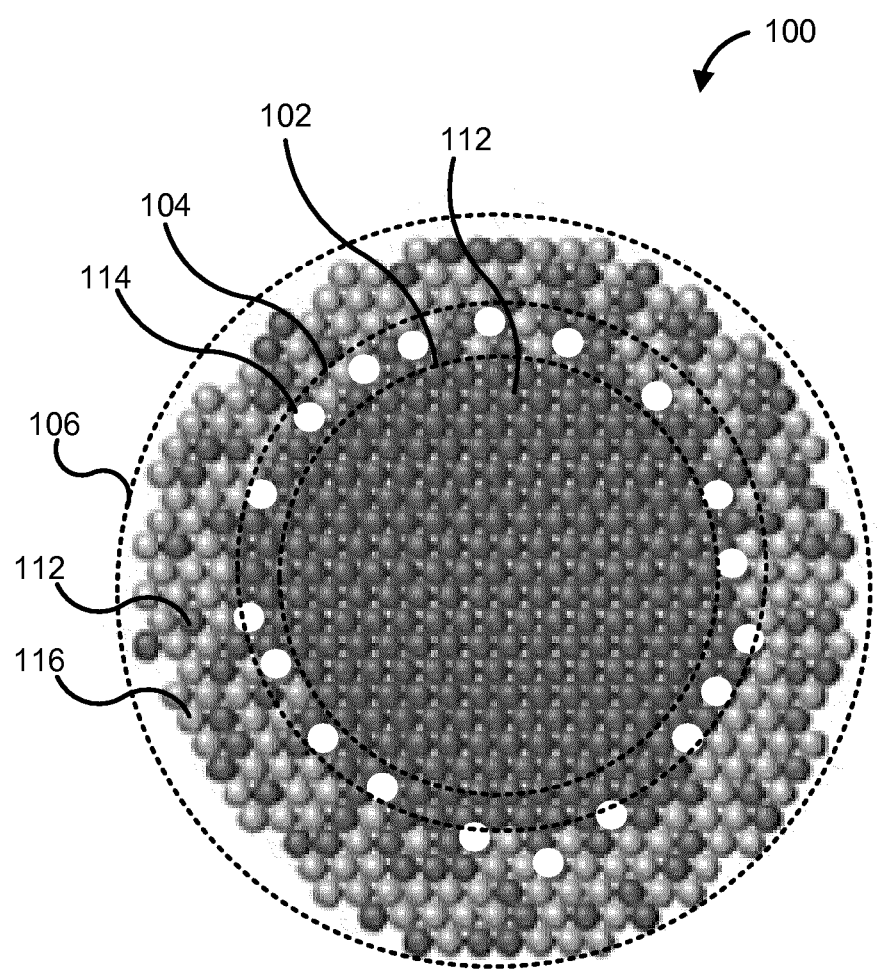
FIG. 1 is cross-section of a MCIS NP that includes an inner core formed from a first metal, an interlayer that includes a plurality of Au atoms disposed on the first metal, and an outer shell including Pt and the first metal (Pt-first metal), according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to multimetallic NPs, and in particular to metal core/interlayer/shell (MCIS) NPs for use as catalysts.

Embodiments of the MCIS particles described herein may provide several benefits including, for example: (1) providing optimal balance between activity and durability due to synergy between stabilizing effects of subsurface Au and modified electronic structure of surface Pt through interaction with buried Ni atoms; (b) having high intrinsic and mass activity; (c) superior durability for ORR with less than 10% catalytic activity loss even after 10,000 potential cycles; (d) and lower cost relative to other purely precious metal NPs.

As used herein the term "nanoparticles (NPs)" is used to refer to particles that have a diameter or cross-section of less than 20 nms.

As used herein, a dash "—" between two materials or absence of a dash sign between two materials means that the materials are alloyed with each other. For example, PtNi or Pt—Ni means an alloy that includes Pt atoms and Ni atoms.

As used herein, a slash "/" or asterisk "@" between two materials is used to indicate a material which is disposed over another material. For example, Au/PtNi indicates that an alloy which includes Pt and Ni atoms is disposed over Au. Similarly, Ni/Au/PtNi means Au is disposed over Ni, and the PtNi alloy is disposed over the Au.

FIG. 1 is a schematic illustration of a multimetallic NP 100 that includes a MCIS NP. The MCIS NP 100 includes an inner core 102, an interlayer 104, and an outer shell 106. The MCIS NP 100 can be used as a catalyst in redox reaction, for example included in a catalyst to facilitate ORR.

The inner core 102 is formed from a first metal 112. In some embodiments, the first metal 112 can be selected from a group consisting of nickel (Ni), titanium (Ti), chromium (Cr), manganese (Mn), iron (Fe), cobalt (Co), copper (Cu), vanadium (V), yttrium (Y), ruthenium (Ru), palladium (Pd), scandium (Sc), tin (Sn), lead (Pb) and zinc (Zn). In a particular embodiment, the first metal 112 includes Ni. In some embodiments, the first metal 112 can be catalytically inert such that all of a catalytic activity of the nanostructure is provided by Pt 116 included in the outer shell 106, as described herein. In other embodiments, the first metal 112 can include any transition metal. In still other embodiments, first metal 112 can also include a catalytic transition metal such that the first metal 112 also contributes to the catalytic activity of the MCIS NP 100.

In some embodiments, the inner core 102 can have a diameter in the range of 2.5 nm to 3.5 nm (e.g., about 2.5 nm, 2.6 nm, 2.7 nm, 2.8 nm, 2.9 nm, 3.0 nm, 3.1 nm, 3.2 nm, 3.3 nm, 3.4 nm or 3.5 nm inclusive of all ranges and values therebetween).

The interlayer 104 is disposed on the inner core 102. The interlayer 104 includes a plurality of gold (Au) atoms 114 disposed over the interlayer 104. In some embodiments, the interlayer 104 can have a thickness in the range of 0.5 nm to 2 nm (e.g., 0.5 nm, 0.6 nm, 0.7 nm, 0.8 nm, 0.9 nm, 1.0 nm, 1.2 nm, 1.4 nm, 1.6 nm, 1.8 nm or 2 nm inclusive of all ranges and values therebetween). Moreover, an amount of Au in the MCIS NP 100 can be in the range of about 5 atom % to about 28 atom % inclusive of all ranges and values therebetween.

The outer shell 106 is disposed over the interlayer 104. The outer shell 106 includes Pt 116 and the first metal 112 (e.g., nickel). In other words, the outer shell 116 includes an alloy of Pt 116 and the first metal 112. As described before, in some embodiments, the first metal 112 (e.g., Ni) is catalytically inert such that all of the catalytic activity of the MCIS NP 100 is provided by the Pt 116.

The outer shell 116 can have a thickness in the range of 0.5 nm to 2 nm (e.g., 0.5 nm, 0.6 nm, 0.7 nm, 0.8 nm, 0.9 nm, 1.0 nm, 1.2 nm, 1.4 nm, 1.6 nm, 1.8 nm or 2 nm inclusive of all ranges and values therebetween). Thus, the MCIS NP can have a diameter or otherwise cross-section in the range of 3.5 nm to 7.5 nm inclusive of all ranges and values therebetween.

A surface of the MCIS NP 100, i.e. an outer surface of the outer shell 106 can be free of Au. In other words, the Au atoms 114 included in the interlayer 104 remain within the interlayer 104 and do not diffuse to the surface of the MCIS NP 100. Thus, all of the catalytic activity of the MCIS NP 100 can be provided by the Pt 116 included in the outer shell 106.

The MCIS NP 100 provides numerous advantages. The Pt-first metal (e.g., a transition metal such as Ni, Co, Fe, Cu, etc.) alloy forming the outer shell 106 demonstrates superior activity to pure Pt as a result of changes in the electronic structure of surface Pt 116 induced by the neighboring first metal 112 atoms. This can, for example optimize the interaction strength of the Pt 116 with oxygenated intermediates during ORR providing higher catalytic activity.

The Au atoms 114 included in the interlayer 104 effectively enhance the durability of the MCIS NP by preventing oxidation and dissolution of the Pt 116 included in the outer shell 106. Furthermore, the Au does not diffuse to the surface of the MCIS NP 100 where it can block active Pt 116 sites which can negatively impact the activity of the MCIS NP particularly at high current densities.

In any catalyst, the activity of the catalyst is generally governed by the atoms or molecules of the catalyst that are available on the surface of the catalyst to undergo the catalyst reaction. This is also the case in NPs where only the surface atoms are responsible for providing the catalytic activity. The core atoms buried beneath the surface are however, unavailable for providing catalytic activity. Thus, if the entire NP is formed from the precious metal (e.g., Pt or Au) that provides the catalytic activity, the core atoms of the precious metal are not available for catalytic activity which greatly increases the cost per kW catalytic activity provided by the NP.

In contrast, the inner core 102 of the MCIS NP 100 is formed from an inexpensive first metal 112 (e.g., Ni). The interlayer 104 includes optimal amounts of the Au atoms 114 to enhance durability, and the outer shell 116 includes an optimal amount of Pt 116 and the first metal 112 thereby, limiting the total amount of precious metal within the MCIS NP 100. In this manner, the MCIS NP 100 has superior durability and provides enhanced catalytic activity at a lower cost. The enhanced durability of the MCIS NP 100 allows the MCIS NP 100 to retain its catalytic activity after multiple catalytic cycles, for example in redox reactions. In some embodiments, the MCIS NP 100 retains greater than 90% of a catalytic activity (i.e., initial catalytic activity) of the MCIS NP 100 after 10,000 potential cycles, for example potential cycles performed during ORR.

Figure 2:
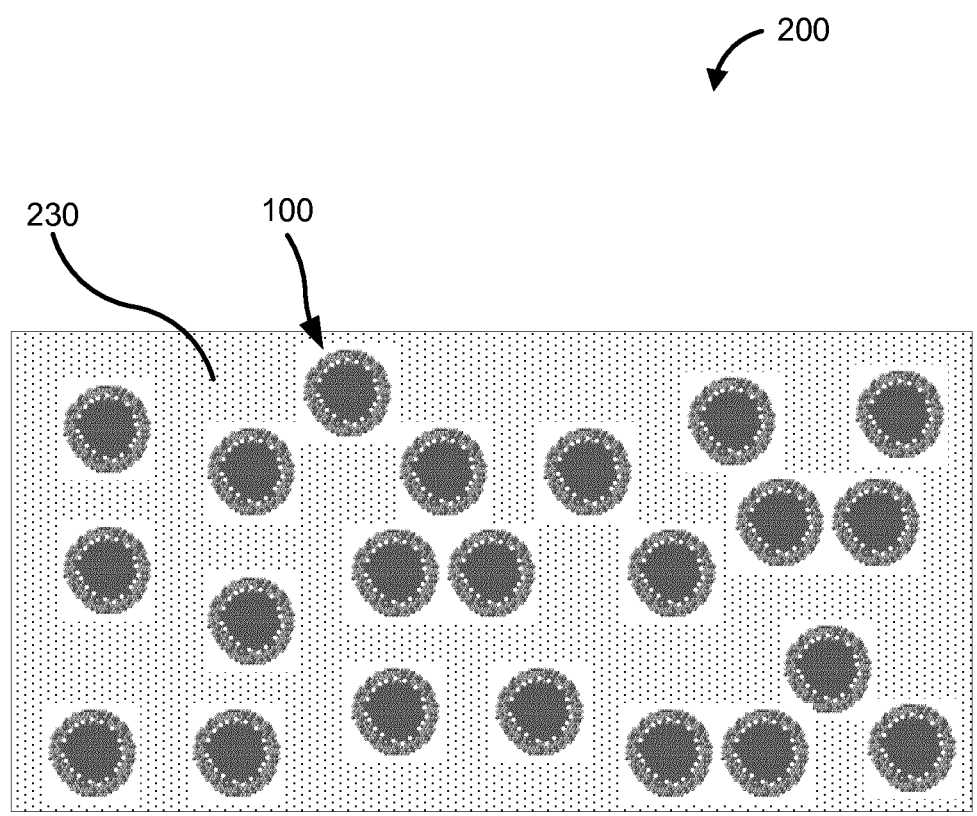
FIG. 2 is a side cross-section of a catalyst according to another embodiment that includes an electrically conducting substrate and a plurality of MCIS NPs of FIG. 1 disposed therein.

FIG. 2 shows a catalyst 200 that includes the MCIS NPs 100. The catalyst 200 includes an electrically conducting substrate 230 which includes a plurality of the MCIS NPs 100 disposed within the electrically conducting substrate 230.

In some embodiments, the electrically conducting substrate 230 includes carbon. For example, the electrically conducting substrate 230 can include carbon black, graphite, carbon powder, carbon nanotubes, graphene or any other form of carbon. In other embodiments, any other suitable electrically conducting substrate (e.g., conducting polymers) can be used.

As described herein, the plurality of MCIS NPs 100 are disposed within the electrically conducting substrate 230. For example, the electrically conducting substrate can include carbon black which can be suspended in a solvent (e.g., methanol, ethanol, acetone, or any other suitable solvent) to form a suspension. A binder can also be included in the suspension. An appropriate loading of the MCIS NPs 100 can be added to the suspension. The solvent can be evaporated such that a solid catalyst 200 is obtained that includes the MCIS NPs 100 disposed or otherwise distributed within the catalyst 200. In some embodiments, the suspension can be casted on an electrically conducting layer to form the catalyst 200. In some embodiments, the catalyst can be disposed on an electrode (e.g., a metal or glass carbon (GC) electrode) and serve as a catalyst in electrochemical reactions (e.g., ORR).

The catalyst 200 can include any suitable loading of the MCIS NPs 100. In some embodiments, the loading of the MCIS NPs 100 in the catalyst 200 can be in the range of 10% to about 60% by atomic ratio (e.g., 10%, 20%, 30%, 40%, 50% or about 60% by atomic ratio inclusive of all ranges and values therebetween). The catalyst 200 that includes the MCIS NPs 100 can have high durability and retain a significant portion of its catalytic activity even after prolonged use. In some embodiments, the catalyst 200 retains greater than 90% of a catalytic activity of the catalyst 200 after 10,000 potential cycles, for example potential cycles in ORR.

Figure 3:
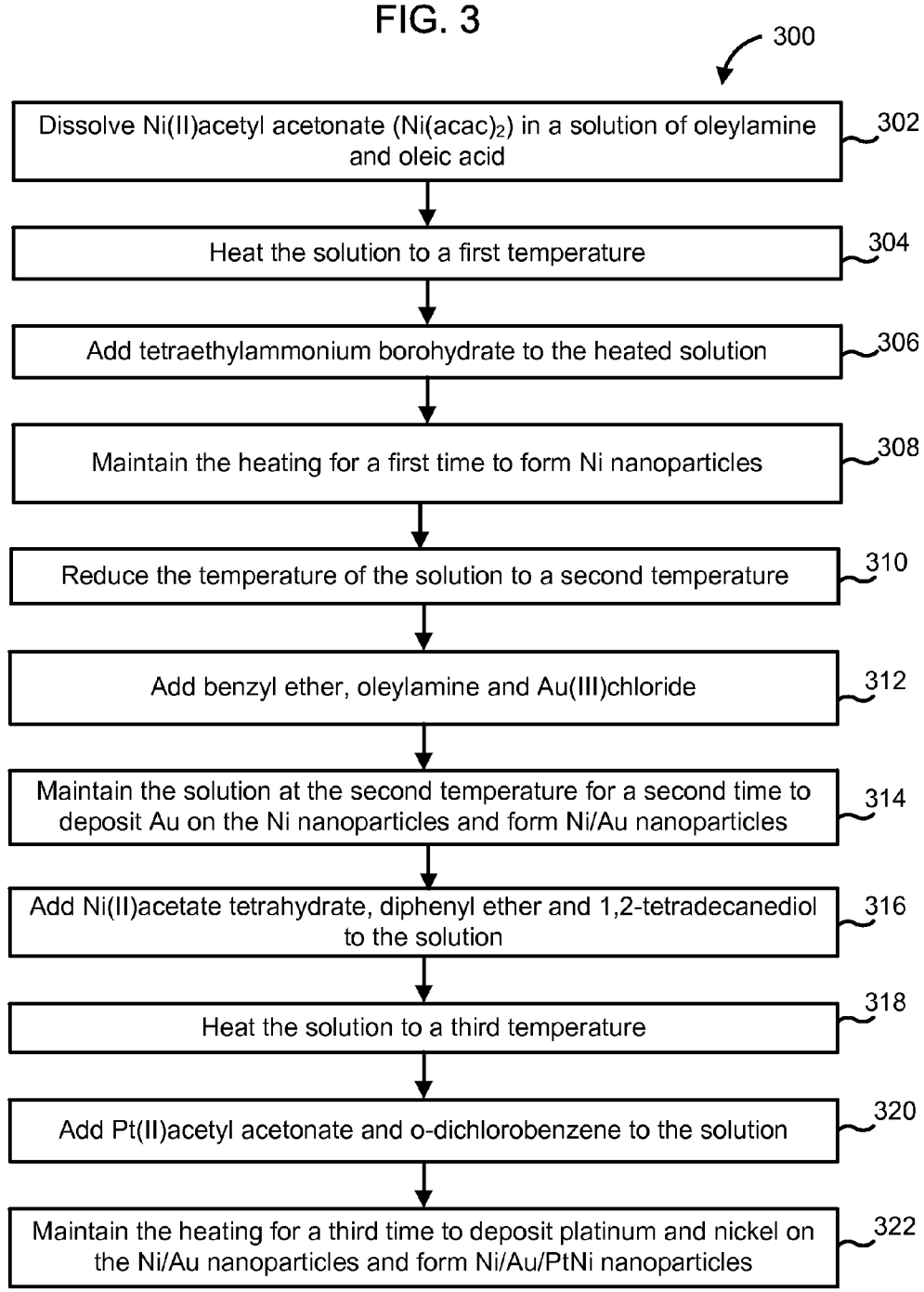
FIG. 3 is a schematic flow diagram of a method of preparing Ni/Au/PtNi NPs, according to yet another embodiment.

FIG. 3 is a schematic flow diagram of an exemplary method 300 of forming MCIS NPs that include a Ni core, an Au interlayer and a Pt—Ni outer shell or Ni/Au/PtNi NPs. It is to be noted that variations of the method 300 can be used to form any of the MCIS NPs as described with respect to the FIG. 1 or any other MCIS NPs described herein.

The method 300 includes dissolving nickel(II)acetyl acetonate (Ni(acac)$_2$) in a solution comprising oleylamine and oleic acid, at 302. In some embodiments, the concentration of the Ni(acac)$_2$ can be about 50 mg to about 100 mg per 10 mL of the oleylamine and 0.3 mL of the oleic acid, inclusive of all ranges and values therebetween.

The solution is heated to a first temperature, at 304. In some embodiments, the first temperature can be in the range of 80 degrees Celsius to 100 degrees Celsius, inclusive of all ranges and values therebetween.

Tetraethylammonium borohydrate (TEAB) is added to the heated solution, at 306. The heating is maintained at the first temperature for a first time to form Ni NPs, at 308. In some embodiments, the first time is in the range of 20 minutes to 40 minutes. The Ni NPs can have a diameter in the range of 2.5 nm to 3.5 nm. The diameter of the Ni NPs can be varied by varying the concentration of the Ni(acac)$_2$ added to the solution. In some embodiments, stirring (e.g., using a magnetic) stirrer can be performed during each of the operations included in the method 300 to facilitate formation of the NPs.

The temperature of the solution is reduced to a second temperature, at 310. In some embodiments, the second temperature can be in the range of 40 degrees Celsius to 60 degrees Celsius. In particular embodiments, the temperature of the solution can be reduced to the first temperature by removing the heat source used to heat the solution to the first temperature and allowing the solution to cool naturally to the second temperature under ambient conditions.

Benzyl ether, oleyl amine and gold(III)chloride are added to the solution, at 312. The solution is maintained at the second temperature for a second time to deposit gold on the nickel NPs and form Ni/Au NPs, at 314. In some embodiments, the second time can be in the range of 10 hours to 14 hours. The concentration of the gold(III)chloride can be in the range of 7.5 mg to about 30 mg for every 0.5 ml of oleyl amine and 0.5 ml of benzyl ether added to the solution. This can for example, yield an amount of Au in the NPs of about 1.7% to about 28%.

Ni(II)acetate tetrahydrate, diphenyl ether and 1,2-tetradecanediol are added to the solution, at 316. The solution is then heated to a third temperature, at 318. In some embodiments, the third temperature can be in the range of 180 degrees Celsius to 220 degrees Celsius.

Platinum(II)acetyl acetonate (Pt(acac)$_2$) and o-dichlorobenzene are added to the solution, at 320. The heat is maintained for a third time, at 322 to deposit platinum and nickel on the nickel/gold nanoparticles and form Ni/Au/PtNi NPs.

A surface of the Ni/Au/Pt—Ni NPs formed using the method 100 can be substantially free of Au. Furthermore, all of a catalytic activity of the Ni/Au/PtNi NPs is provided by the Pt. The Ni/Au/PtNi NPs can be included in a catalyst, for example the catalyst 100 to provide superior catalytic activity. The Ni/Au/PtNi NPs can also be highly durable, particularly for use as a catalyst in electrochemical redox reactions such as ORRs. In some embodiments, the Ni/Au/PtNi NPs formed using the method 300 can retain greater than 90% of a catalytic activity of the NP even after 10,000 potential cycles.

Experimental Examples

Figure 4:
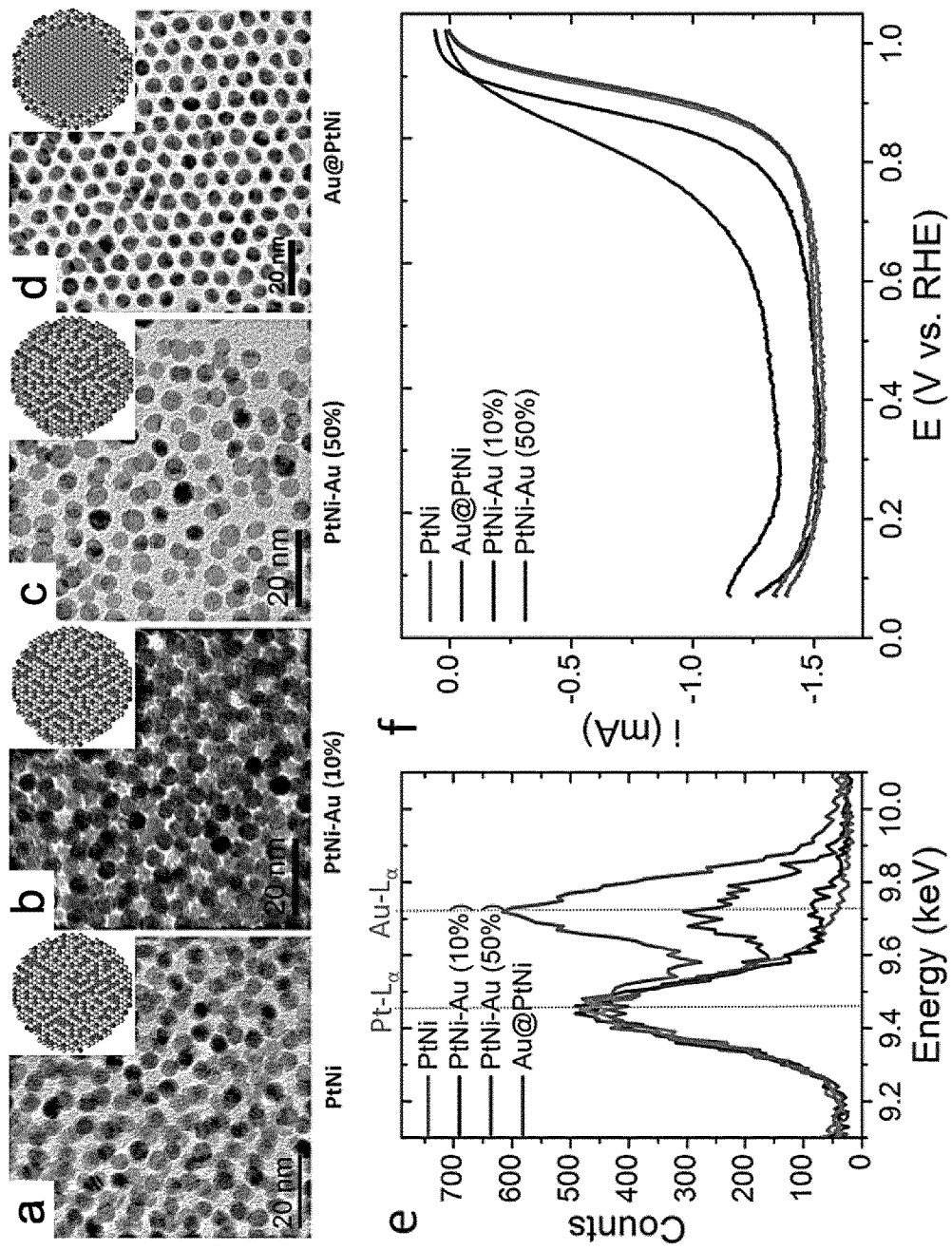
FIG. 4 panels (a-d) are TEM images and illustrations of the structures and compositional profiles of various NPs.

To demonstrate how the placement of Au can affect the catalytic properties of Pt-alloys (e.g., PtNi alloys) various NPs having different placement and concentrations of Au were prepared. FIG. 4 panels (a-d) are TEM images and illustrations of the structures and compositional profiles of various NP. FIG. 4 panel (a) is a TEM image of about 5.0 nm diameter PtNi NPs. FIG. 4 panel (b) is a TEM image of about 5.1 nm diameter PtNi—Au NPs that have a surface coverage of Au of about 10%. FIG. 4 panel (c) is a TEM image of about 5.1 nm diameter PtNi—Au NPs that have a surface coverage of Au of about 50% and FIG. 4 panel (d) is a TEM image of Au/PtNi NPs (also referred to herein as "Au@PtNi NPs") of about 5.4 nm diameter.

The PtNi NPs are prepared by mixing 83 mg of Nickel (II)acetate tetrahydrate, 10 ml diphenyl ether, 0.2 ml oleylamine and 0.04 gram 1,2-tetradecandediol to form a mixture. The mixture is heated to a temperature of 200 degrees Celsius. At 200 degrees Celsius a solution containing 65 mg Pt(acac)$_2$ and 0.75 ml o-dichlorobenzene is injected into the reaction mixture. The reaction is maintained at 200 degrees Celsius for 30 minutes. This yields about 5 nm PtNi NPs as shown in FIG. 4 panel (a).

The PtNi—Au NPs are formed by using 5 nm diameter PtNi NPs as seeds. Au deposition is achieved by reaction with a mixture of 80 mg Au(III)chloride, 4 ml oleylamine and 4 ml benzyl ether at various ratio of PtNi to Au and various reaction times. The PtNi—Au nanoparticles formed have Au deposited on the PtNi NPs. The amount of the Au(III)chloride and the reaction time is varied to obtained PtNi—Au NPs having about 10% Au (FIG. 4 panel (b)) to about 50% Au (FIG. 4 panel (c)) in the PtNi—Au NPs.

Figure 6:
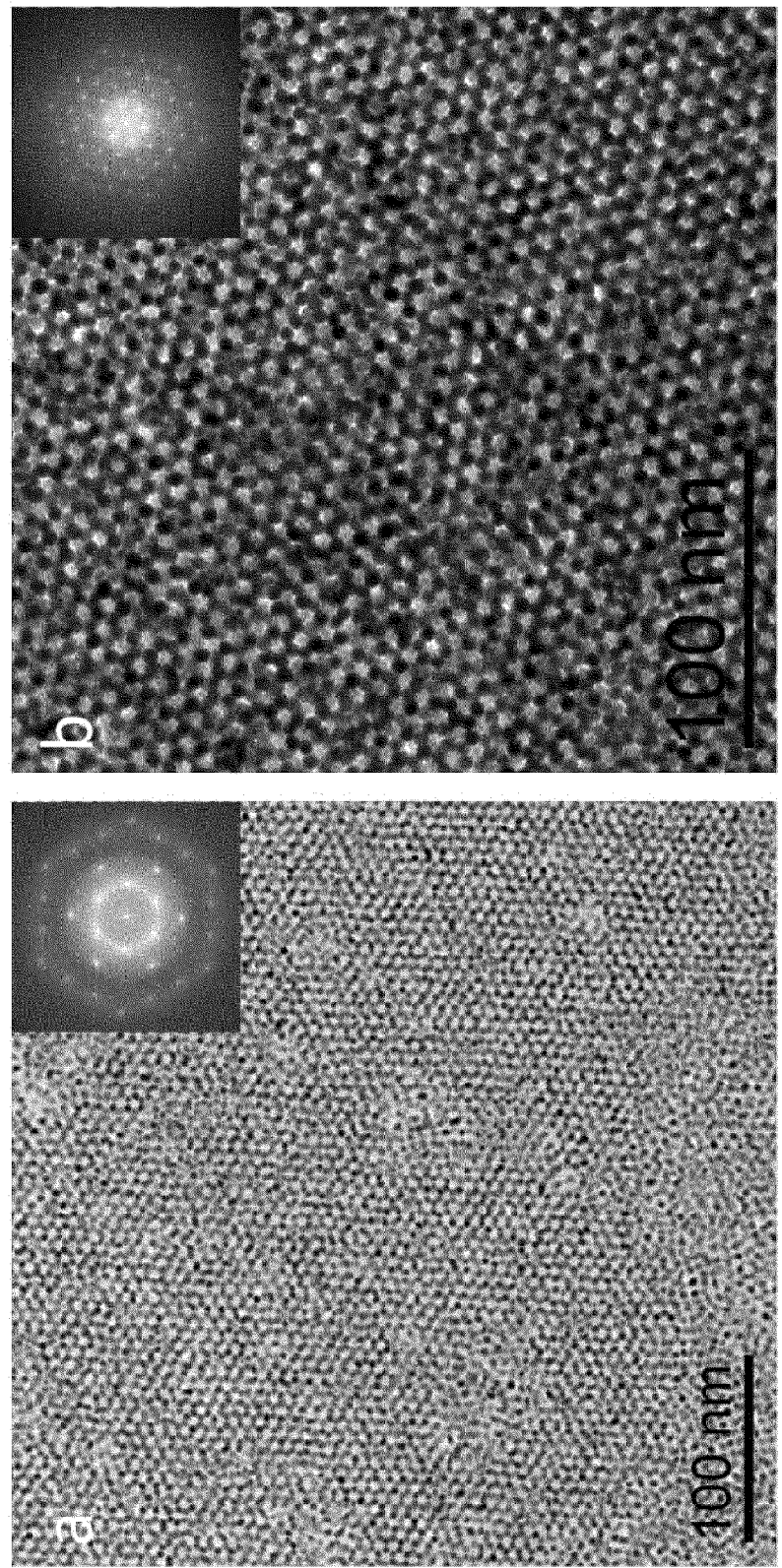
FIG. 6 panel (a) is a TEM image of 5.0 nm PtNi NPs and FIG. 6 panel (b) is a TEM image of about 5.1 nm PtNi—Au NPs (10% Au coverage); inset in each panel is a Fast Fourier Transform (FFT) pattern of large-area superlattice of the NPs.

FIG. 6 panel (a) is a TEM image of the 5.0 nm PtNi NPs and FIG. 6 panel (b) is a TEM image of about 5.1 nm PtNi—Au NPs (10% Au coverage). Inset in each panel is a Fast Fourier Transform (FFT) pattern of large-area superlattice of the NPs. The PtNi—Au NPs of FIG. 4 panel (c) that include 50% Au could not form large area superlattice because of their broad size distribution.

Figure 5:
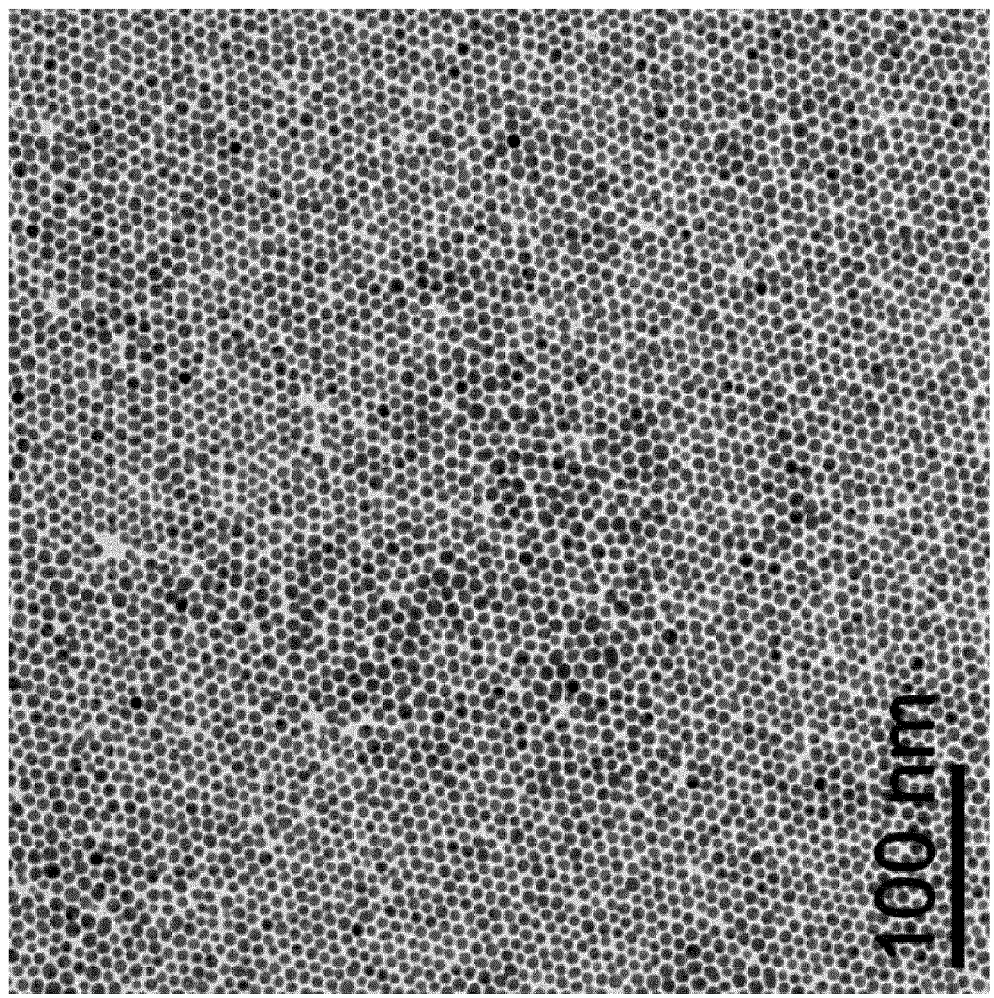
FIG. 5 is a TEM image of about 5.1 nm Au NPs.

Au/PtNi NPs (also referred to herein as Au@PtNi NPs) are prepared by introducing 5.1 nm Au NPs during synthesis of PtNi NPs as described above. FIG. 5 shows a TEM image of the Au NPs used as seeds for the preparation of the Au/PtNi NPs. The PtNi alloy deposits on the Au to yield Au/PtNi NPs (FIG. 4 panel (d)) which have a Au core and PtNi alloy deposited on the Au core. The thickness of the PtNi alloy deposited on the Au core was about 1 nm.

FIG. 4 panel (e) is an EDX plot showing the Pt peak (Pt—La line) and Au peak (Au—La line) of the nanoparticles corresponding to the structures shown in panels (a-d). The ORR activity trend associated with Au placement is shown in FIG. 4 panel (f), where the Au/PtNi core-shell nanoparticles match the specific activity of PtNi alloy nanoparticles, however, with enhanced stability and lower Pt mass as Pt is only present in the about 1 nm thick shells.

All electrochemical measurements were performed by incorporating the synthesized NPs onto carbon black (Cabot, Vulcan XC-72), and washing with ethanol. Organic surfactants are removed by thermal treatment in air at a temperature below 200 degrees Celsius for 12 h to form catalyst powders. Total NP loading is controlled at about 50%. The actual loadings are determined by inductively coupled plasma-mass spectroscopy (ICP-MS). The treated catalyst powders are formed into catalyst inks by adding water (from 0.5 to 1 mg catalysts/mL water), followed by sonication for 30 min. Then, 10 μL, to 20 μL, of the cathode ink is deposited on a GC electrode (6 mm in diameter) and dried to form a uniform thin film that is further characterized in an electrochemical cell. The electrochemical measurements are carried out in a three-compartment electrochemical cell with a Pine rotational disk electrode (RDE) setup and an Autolab 302 potentiostat. A saturated Ag/AgCl electrode and a Pt wire (or Au wire for dissolution tests) are used as reference and counter electrodes, respectively with 0.1 M $HClO_4$ used as electrolyte.

It is observed that Au present on the surface results in lower specific activity where 10% surface coverage of Au leads to a decrease in half-wave by 40 mV while 50% surface coverage leads to a loss of over 100 mV in the half-wave potential and a significant decrease in the diffusion limited current. This suggests a partial shift from 4-electron toward 2-electron oxygen reduction which is the mechanism by which oxygen is reduced on Au, forming $H_2O_2$ rather than $H_2O$. Even though, surface Au atoms are effectively blocking active Pt sites resulting in decreased activity, the PtNi—Au NPs are also found to have enhanced durability in comparison to the Au-free PtNi alloy NPs.

Figure 7:
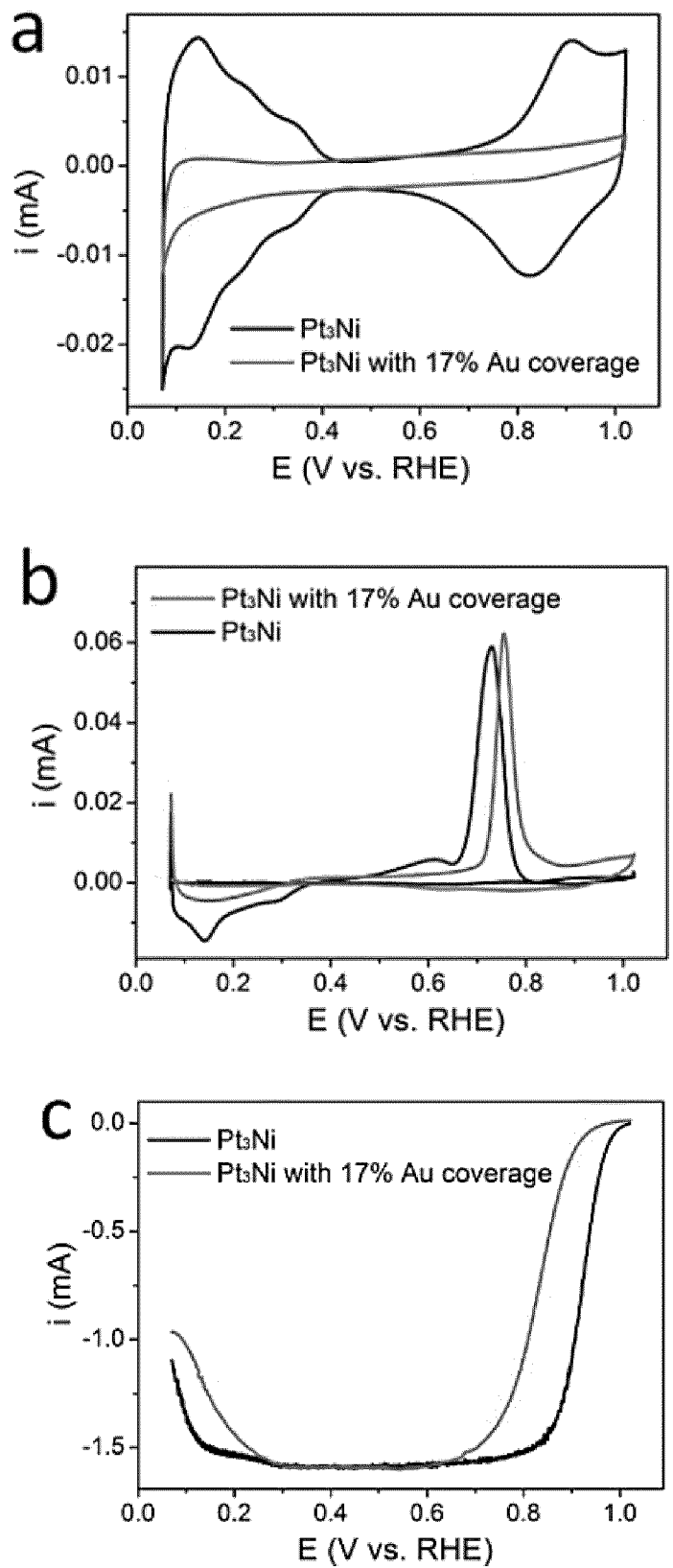
FIG. 7 panel (a) are cyclic voltammetry (CV) plots of a plain $Pt_3Ni$ substrate, and a $Pt_3Ni$ substrate coated with Au having a surface coverage of about 17%.

FIG. 7 panel (a) is a cyclic voltammetry (CV) plot of a $Pt_3Ni$ thin film and a $Pt_3Ni$ thin film coated with Au having a surface coverage of about 17%. FIG. 7 panel (b) is the CV plot of the plain and Au $Pt_3Ni$ thin films of panel (a) after subtracting CO stripping curve, and FIG. 7 panel (c) is a plot of ORR polarization curves of the plain $Pt_3Ni$ film and Au coated $Pt_3Ni$ film. The same deactivation which is observed on the PtNi—Au NPs is also observed on the Au coated $Pt_3Ni$ substrates. A Au surface coverage as low as 0.17 monolayer on a $Pt_3Ni$ thin film is found to substantially deactivate ORR. From these results it is clear that the beneficial effects of Au are best realized in Pt—Au—Ni ternary system when Au is located beneath the surface, not directly being exposed to the reactive species.

Figure 8:
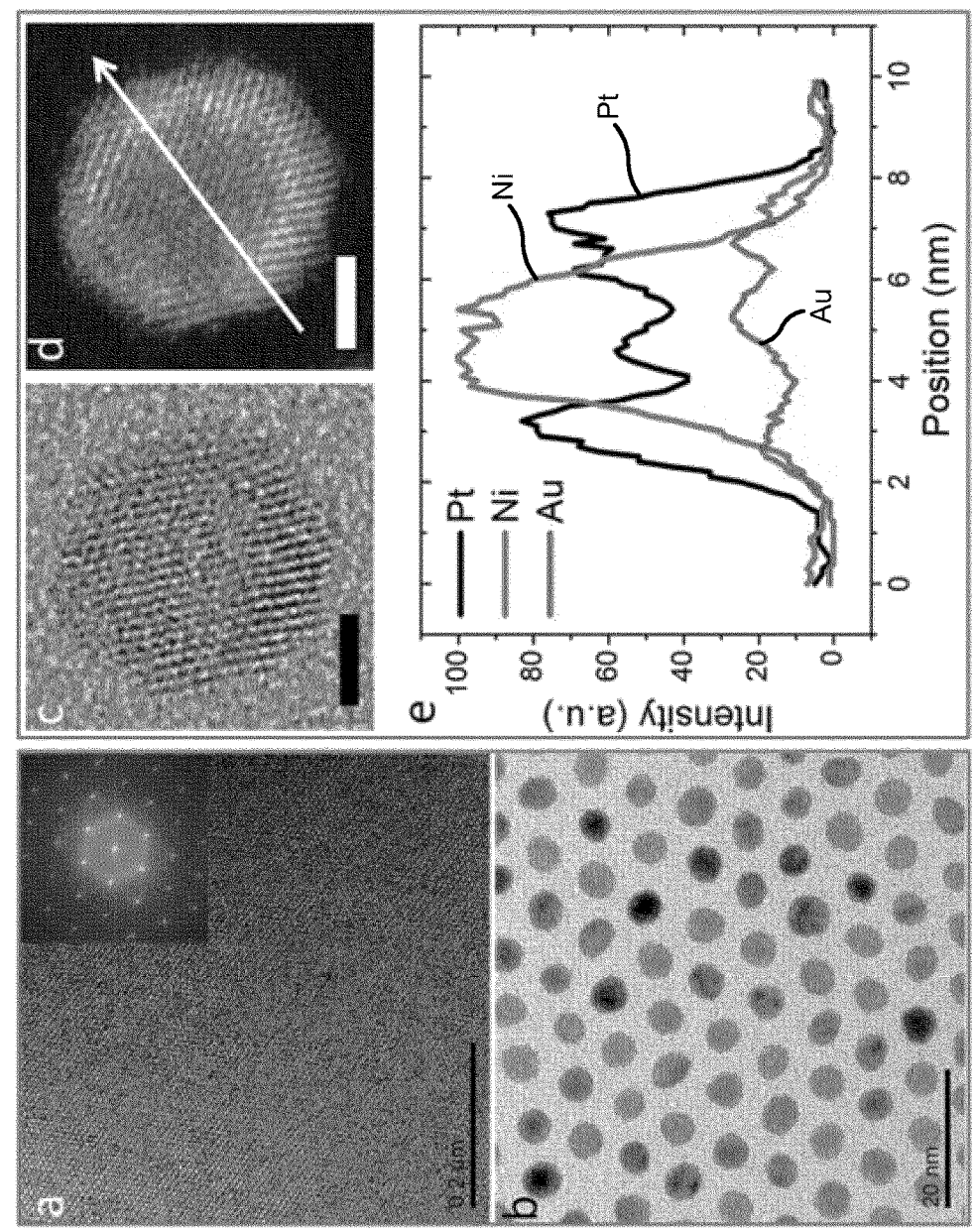
FIG. 8 panels (a) and (b) are TEM images of as-synthesized 5 nm Ni/Au/PtNi NPs, inset in panel (a) is a fast fourier transform (FFT) pattern showing a long range ordered super lattice of Ni/Au/PtNi NPs due to high monodispersity; panels (c) is a bright field STEM image and panel (d) is a darkfield STEM image of the particles of panels (a) and (b); panel (e) is an electron diffraction X-ray (EDX) spectra which clearly shows the core/interlayer/shell structure of the NPs, in addition the EDX line-profile shows a Pt-rich skeleton structure over the Au-coated Ni core.
Figure 9:
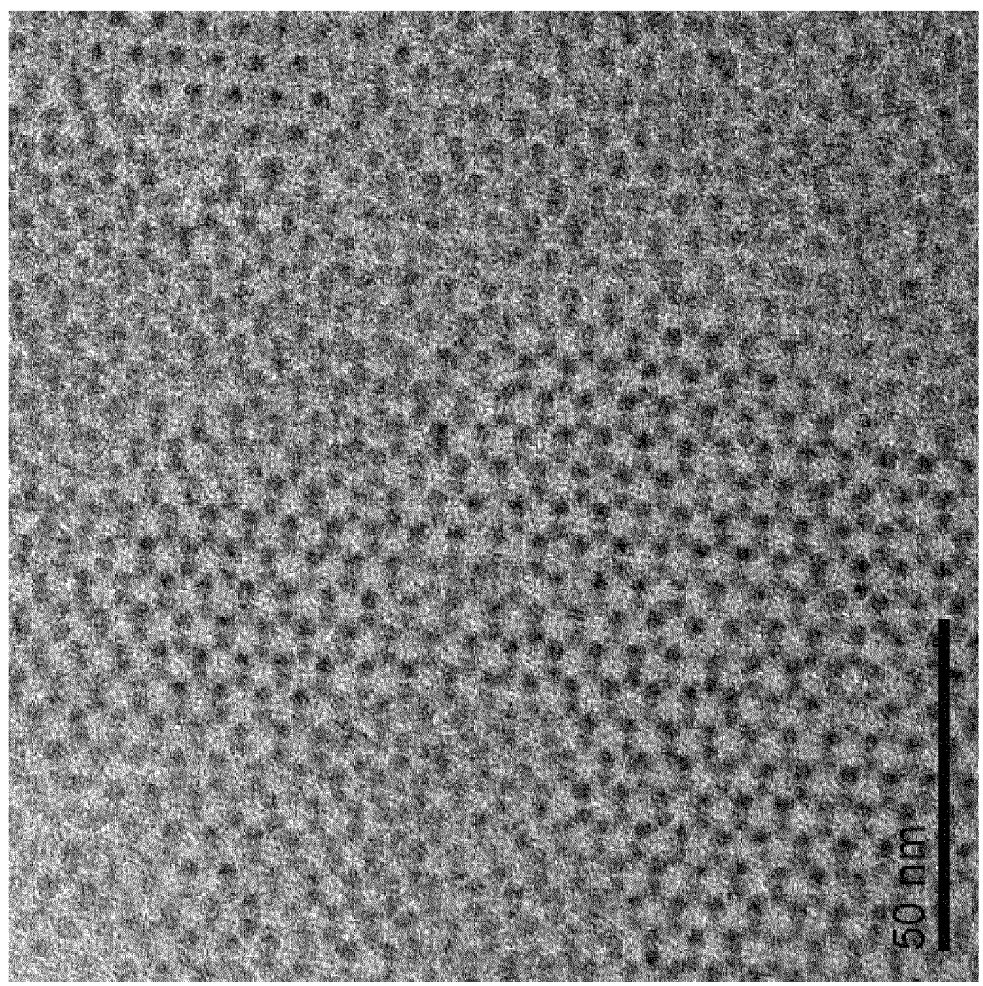
FIG. 9 is a TEM image of 3.1 nm Ni NPs.

FIG. 8 panels (a) and (b) are TEM images of as-synthesized 5 nm Ni/Au/PtNi NPs (also referred to herein as Ni@Au@PtNi NPs). The Ni/Au/PtNi NPs are formed by dissolving 64 mg Ni(acac)2 in 10 mL oleylamine and 0.3 mL oleic acid. The solution is heated to a temperature of 90 degrees Celsius. At 90 degrees Celsius, 0.4 mL TEAB is injected into the reaction, and the reaction is maintained at 90 degrees Celsius for 30 min. This yields 3.1 nm Ni NPs in the solution. FIG. 9 shows a TEM image of the as synthesized 3.1 nm Ni NPs.

After the reaction, the solution is allowed to cool down to 50 degrees Celsius. Then 7.5 mg gold(III)chloride, 0.5 mL oleylamine, and 0.5 mL benzyl ether are added to the solution. The solution is maintained at 50 degrees Celsius for 12 hours to deposit Au over the Ni NPs and form Ni/Au NPs. Next 83 mg Ni(II)acetate tetrahydrate, 10 mL diphenyl ether, 0.2 mL oleic acid, 0.2 mL oleylamine, and 0.04 g 1,2-tetradecanediol are added to the solution, and the solution is heated to 200 degrees Celsius. At 200 degrees Celsius, a mixture containing 65 mg Pt(acac)2 and 0.75 mL o-dichlorobenzene is injected into the solution. The reaction is maintained at 200 degrees Celsius for 30 min. This yields the about 5.0 nm Ni/Au/PtNi NPs shown in FIG. 8.

Figure 10:
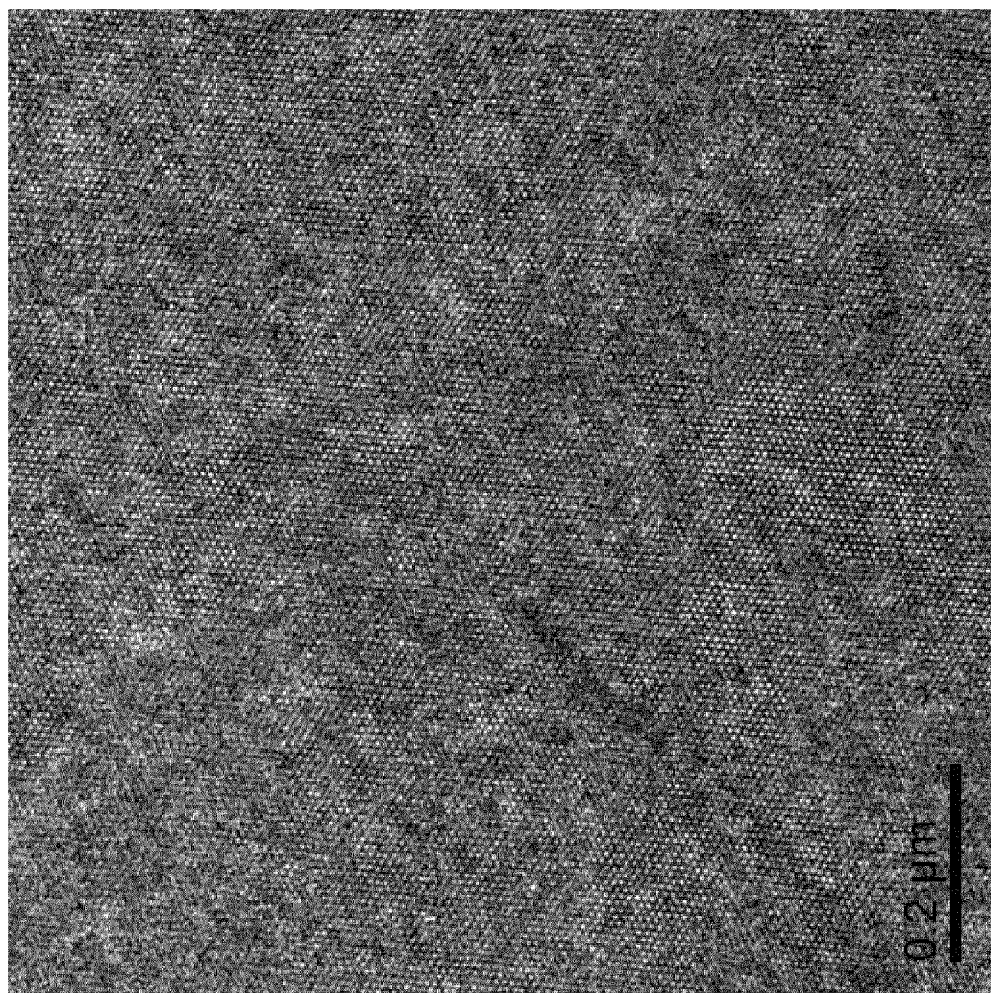
FIG. 10 is a TEM image of a large area superlattice of 5.0 nm Ni/Au/PtNi NPs.

In this manner, using a controlled layer-by-layer growth mechanism the Ni/Au/PtNi MCIS NPs are obtained. FIG. 10 is a TEM image of a large-area superlattice structure of the 5.0 nm Ni/Au/PtNi NPs. The inset in FIG. 8 panel (a) is a fast fourier transform (FFT) pattern showing a long range ordered super lattice of Ni/Au/PtNi NPs due to high monodispersity.

FIG. 8 panel (c) is a bright field STEM image and FIG. 8 panel (d) is a darkfield STEM image of the particles of FIG. 8 panels (a) and (b). The scanning transmission electron microscopy (STEM) images show that after exposure to acidic electrolyte, the core-shell structure and the Ni core are preserved. This is confirmed by an electron diffraction X-ray (EDX) spectra shown in panel which clearly shows the core/interlayer/shell structure of the Ni/Au/PtNi NPs. In addition the EDX line-profile shows a Pt-rich skeleton structure over the Au-coated Ni core, thereby confirming the formation of the Pt-skeleton surface.

Typically, annealing of the acid-leached nanoparticles is used to transform the surface from a rough Pt-Skeleton to the ideal Pt-skin, however this would inevitably induce diffusion of Au atoms to the surface because of their lower surface energy with respect to Pt (1.506 $Jm^{-2}$ Au vs. 2.489 $Jm^{-2}$ Pt). In order to demonstrate this, elemental analysis was performed after annealing and is shown in FIG. 11.

Figure 12:
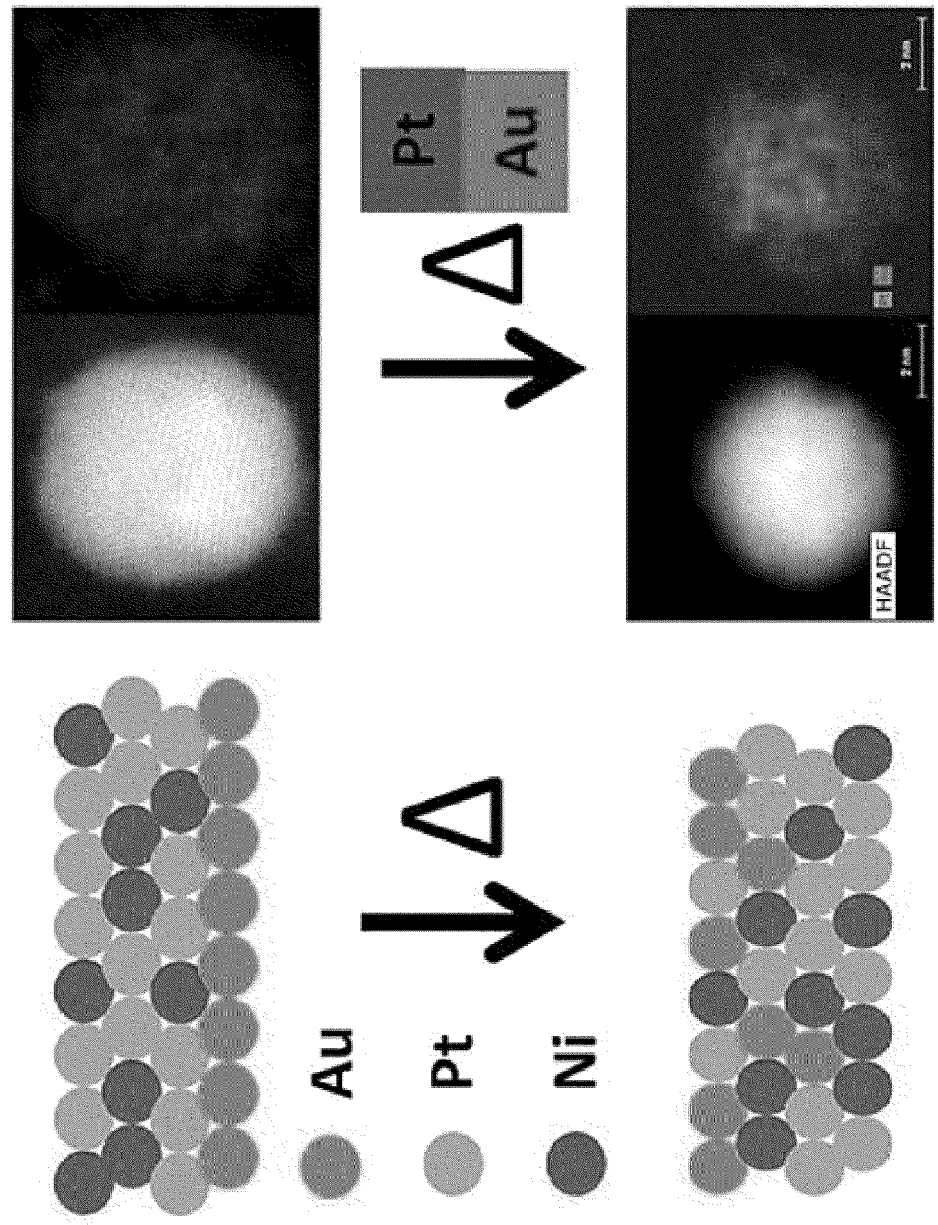
FIG. 12 is a schematic illustration and EDX images of PtAu NPs before and after annealing; the images show that because of different surface energies, Au atoms tend to diffuse to a surface of the NPs under a thermal treatment (heating in the annealing process); EDX mapping experiments show that annealing of a homogeneous PtAu nanoparticle results in a core-shell nanoparticle with Au-rich shell, confirming that Au atoms tend to diffuse to surface.

Because of the different surface energies, Au atoms tend to diffuse to surface under a thermal treatment (heating in the annealing process). FIG. 12 shows EDX mapping experiments which reveal that annealing of a homogeneous PtAu nanoparticle results in a core-shell nanoparticle with Au-rich shell, confirming that Au atoms tend to diffuse to surface. Instead of Ni/Au/PtNi NPs with a Pt-Skin structure, a Pt—Au—Ni nanostructure with surface Au which has a poor ORR electrocatalytic property is generated after annealing at 400 degree Celsius. ORR curves shown in FIG. 11 are taken in $O_2$-saturated 0.1 M $HClO_4$, on a rotating disc electrode (RDE) at a rotating speed of 1,600 rpm, and at a scan rate of 20 mV/s. This clearly demonstrates that it is not possible to obtain the MCIS NPs described herein (e.g., the Ni/Au/PtNi NPs) using previously described annealing processes.

Figure 13:
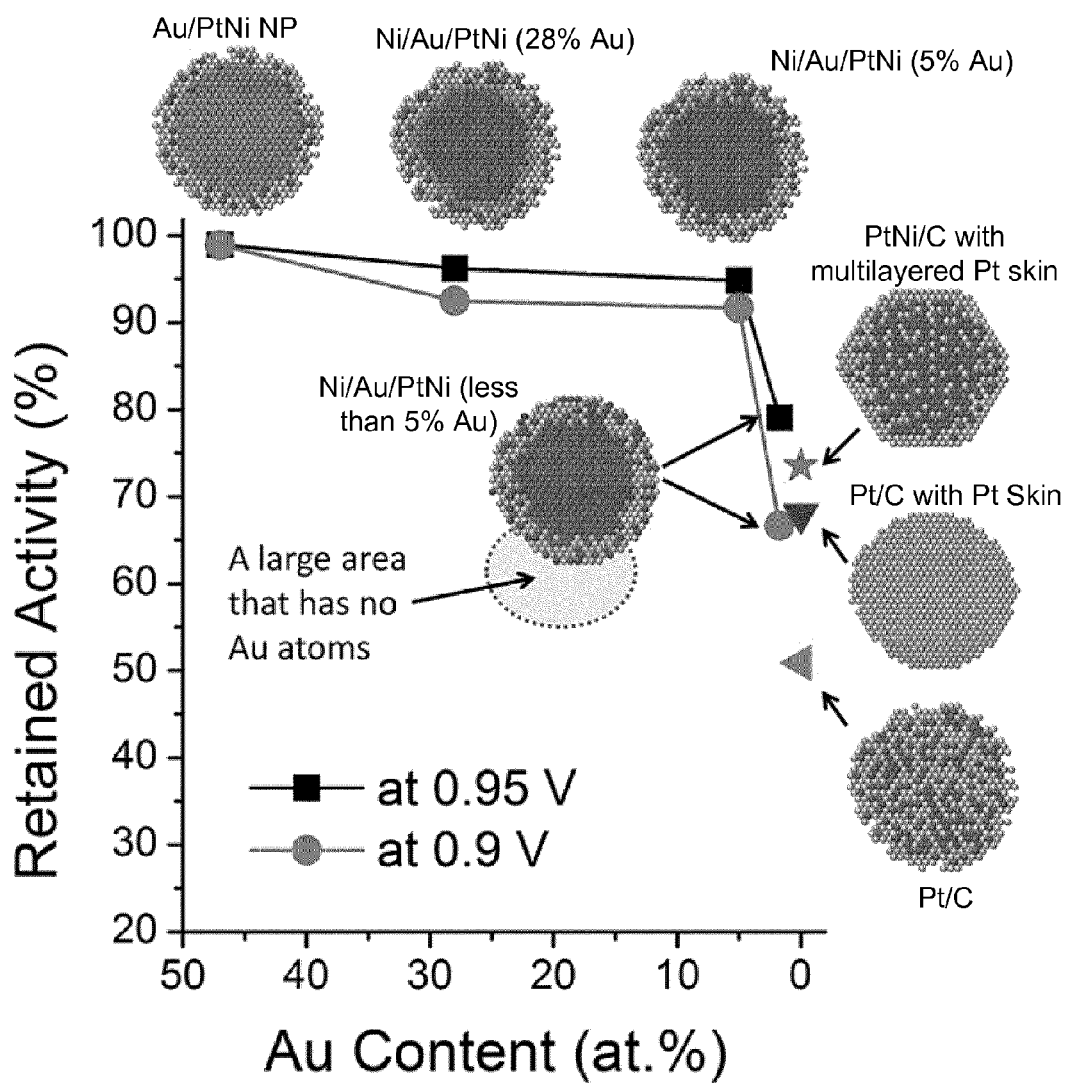
FIG. 13 is a plot of correlation between durability (retained activity after 10,000 electrochemical cycles up to 1.1 V) and the Au content in the subsurface of nanoparticles; the activity of each corresponding Pt—Au—Ni nanostructure is presented as the kinetic current densities measured at 0.95 V (square) and 0.9 V (circle); star, dark triangle, and light triangle represent the retained activity (measured at 0.95 V) of PtNi/C with a multilayered Pt-Skin, Pt/C, and PtNi/C with Pt-Skeleton surface morphology respectively; the activity after cycles drops significantly if the Au content is below 5%, because Ni atoms are leached out through the area that has no Au atoms.

The amount of Au included in the interlayer disposed over the Ni core of the Ni/Au/PtNi NPs can be controlled down to about 0.25 monolayer (ML). FIG. 13 is a plot of correlation between durability (i.e., retained catalytic activity) after 10,000 potential cycles in 0.1 M $HClO_4$ between 0.6 V and 1.1 V versus rotating hydrogen electrode (RHE). As described before, the amount of Au from a solid Au core where Au makes up 47 atom % of the nanoparticle (Au/PtNi NP), to an equivalent of about 1 ML over the Ni core in the interlayer where Au is about 28 atom % (Ni/Au/PtNi NPs (28% Au)) of the crystal down to a Au content of about 5 atom % which is about 0.25 ML on the Ni core (Ni/Au/PtNi NPs (5% Au)). Even for the lowest Au content of 5 atom %, 95% and 92% of the catalytic activity at 0.95 V and 0.90 V vs. RHE respectively are retained by the Ni/Au/PtNi NPs and there is minimal change to the morphology of the Ni/Au/PtNi NPs. However, Ni/Au/PtNi NPs having less than 5 atom % of Au in the interlayer showed a much lower retention of the catalytic activity because of leaching the Ni atoms into the solution through the area that has no Au atoms (FIG. 13).

The durability (i.e., catalytic activity retention) of the Ni/Au/PtNi NPs was also compared with PtNi NPs distributed in a carbon black substrate (PtNi/C) that have multilayer Pt-skin, Pt NPs distributed in carbon (Pt/C), and PtNi NPs with Pt-Skeleton surface morphology also distributed in carbon. The ORR catalytic activity of Ni/Au/PtNi NPs was tested by forming a catalyst that includes the Ni/Au/PtNi NPs suspended in a carbon black matrix (Ni/Au/PtNi/C catalysts) and disposed over a GC electrode. The ORR activity is tested and compared with the Pt/C and PtNi/C electrocatalysts, described herein. In contrast to the high catalytic activity retention demonstrate by the Ni/Au/PtNi NPs, both Pt/C and PtNi/C with Pt-Skeleton surfaces retain less than 70% of their initial activity (0.95 V).

Figure 14:
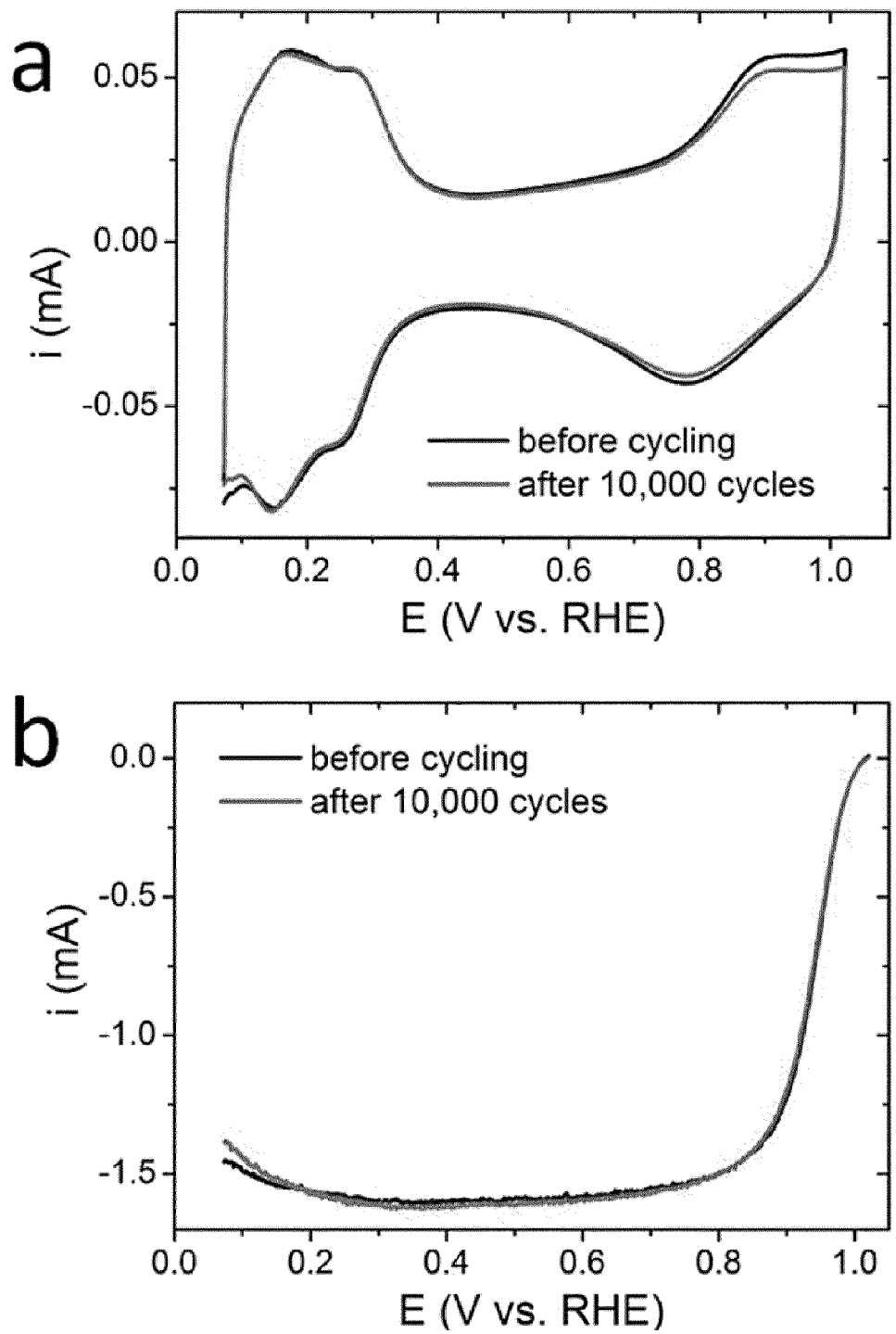
FIG. 14 panel (a) is a CV curve and panel (b) is an ORR polarization curve of the optimized Ni/Au/PtNi/C catalysts before and after 10,000 cycles of electrochemical cycling up to 1.1 V, demonstrating the high durability; CV curves are taken in Ar-saturated 0.1 M $HClO_4$, at a scan rate of 50 mV/s. ORR curves are taken in $O_2$-saturated 0.1 M $HClO_4$, on rotating disc electrode at a rotating speed of 1,600 rpm, and at a scan rate of 20 mV/s.

FIG. 14 panel (a) is a CV curve and panel (b) is an ORR polarization curves of the optimized Ni/Au/PtNi/C catalysts before and after 10,000 cycles of electrochemical cycling up to 1.1 V. CV curves are taken in Ar-saturated 0.1 M $HClO_4$, at a scan rate of 50 mV/s. ORR curves are taken in $O_2$-saturated 0.1 M $HClO_4$, on rotating disc electrode at a rotating speed of 1,600 rpm, and at a scan rate of 20 mV/s.

As shown in FIG. 14 panels (a) and (b), the Ni/Au/PtNi/C electrocatalysts possess great durability towards the ORR without noticeable loss in either ECSA or specific activity. The ratio of ECSA determined by CO-stripping to that by under potential deposited hydrogen on Ni/Au/PtNi is 1.40, close to the value which is regarded as a characteristic signature of the Pt-Skin structure which is a reflection of the change in hydrogen adsorption strength induced by the underlying transition metal, in this case Ni. The apparent change in hydrogen binding strength is ascribed to the Au presence that induces formation of the "pseudo-Pt-Skin" Subsurface Au has a tendency to segregate over Pt but never gets to the topmost surface under relevant ORR conditions due to strong interaction between Pt surface atoms and oxygenated species. This facilitates an electrochemically induced annealing effect and formation of the Pt-Skin like surface structure.

Figure 15:
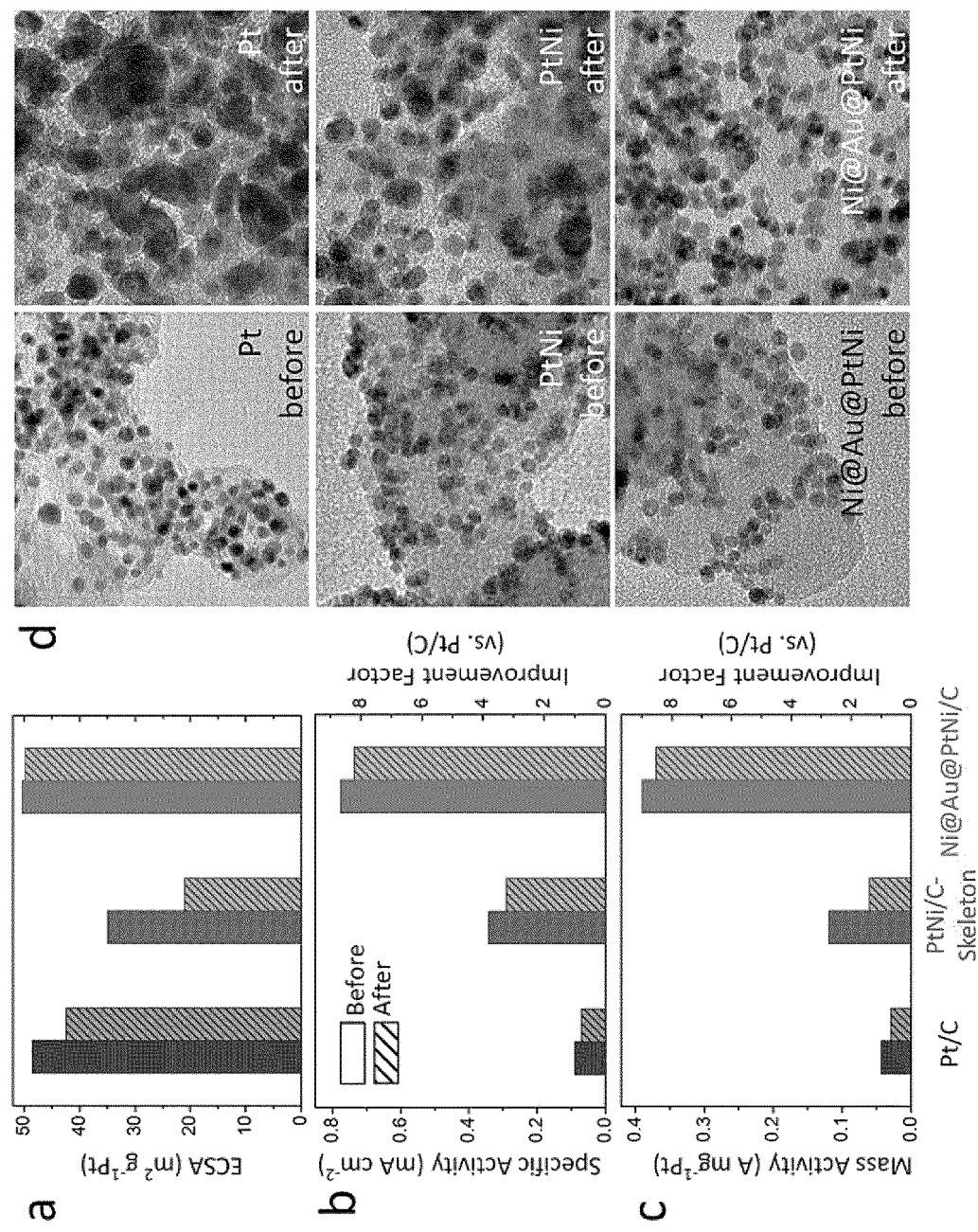
FIG. 15 panels (a-c) are bar charts of electrochemically active surface areas (panel (a)), specific activities (panel (b)), and mass activities (panel (c)) of Pt/C, PtNi/C (with Pt-Skeleton), and Ni/Au/PtNi/C (with pseudo Pt-Skin) electrocatalysts before and after 10,000 cycles of electrochemical cycling up to 1.1 V; the activity is normalized kinetic current density measured at 0.95 V; the specific activity is the activity normalized to the ECSA measured by CO-stripping; panel (d) are TEM images of Pt NPs, PtNi NPs, and Ni/Au/PtNi NPs before and after 10,000 cycles up to 1.1 V.

FIG. 15 panels (a-c) are bar charts showing electrochemically active surface areas (panel (a)), specific activities (panel (b)), and mass activities (panel (c)) of Pt/C, PtNi/C (with Pt-Skeleton), and Ni/Au/PtNi/C (i.e., Ni/Au/PtNi NPs distributed in carbon black) electrocatalysts before and after 10,000 cycles of electrochemical cycling up to 1.1 V. The activity is normalized kinetic current density measured at 0.95 V. The specific activity is the activity normalized to the ECSA measured by CO-stripping. Panel (d) includes TEM images of Pt, PtNi, and Ni/Au/PtNi NPs before and after 10,000 cycles up to 1.1 V. All the images are at a size of 100 nm×100 nm.

The specific activity and mass activity enhancement of Ni/Au/PtNi/C is over 8-fold versus the Pt/C and outperforms multilayered Pt-Skin PtNi/C due to the Ni replacement of expensive Pt in the core. As shown in FIG. 15 panel (d) after potential cycling, the size of Pt and PtNi NPs is significantly changed. Big particles (>10 nm) and small particles (<5 nm) are observed instead of the initial about 5 nm diameter NPs, indicating that Pt and PtNi are affected by the well-known Ostwald ripening process under the potential cycling. However, such change in size and shape are not observed on the Ni/Au/PtNi NPs, again demonstrating the synergy between high activity and high durability of Ni/Au/PtNi/C electrocatalysts.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

What is claimed is:
1. A catalyst, comprising:
an electrically conducting substrate;
a plurality of nanoparticles disposed within the electrically conducting substrate, the nanoparticles comprising:
an inner core consisting of nickel,
an interlayer disposed on the inner core, the interlayer consisting of a plurality of gold atoms, and an outer shell disposed over the interlayer, the outer shell consisting of platinum and nickel,
wherein, a surface of the nanoparticles is free of gold,
wherein an amount of gold in the nanoparticle is in a range of 5 atom % to 28 atom %.

2. The catalyst of claim 1, wherein the electrically conducting substrate comprises carbon.

3. The catalyst of claim 1, wherein the inner core has a diameter in the range of 2.5 nm to 3.5 nm.

4. The catalyst of claim 3, wherein the interlayer has a thickness in the range of 0.5 nm to 2 nm.

5. The catalyst of claim 4, wherein the outer shell has a thickness in the range of 0.5 nm to 2 nm.

6. The catalyst of claim 1, wherein the catalyst retains greater than 90% of a catalytic activity of the catalyst after 10,000 potential cycles.

* * * * *